(12) United States Patent
Kajikawa et al.

(10) Patent No.: US 11,009,421 B2
(45) Date of Patent: May 18, 2021

(54) DYNAMIC BALANCING TEST AND CORRECTION APPARATUS

(71) Applicant: Shimadzu Industrial Systems Co., Ltd., Shiga (JP)

(72) Inventors: Atsushi Kajikawa, Shiga (JP); Shinya Naito, Shiga (JP)

(73) Assignee: Shimadzu Industrial Systems Co., Ltd., Shiga (JP)

( * ) Notice: Subject to any disclaimer, the term of this patent is extended or adjusted under 35 U.S.C. 154(b) by 173 days.

(21) Appl. No.: 16/353,109

(22) Filed: Mar. 14, 2019

(65) Prior Publication Data

US 2019/0285502 A1    Sep. 19, 2019

(30) Foreign Application Priority Data

Mar. 16, 2018 (JP) .............................. JP2018-049872

(51) Int. Cl.
*G01M 1/34* (2006.01)
*G01M 1/16* (2006.01)

(52) U.S. Cl.
CPC ................ *G01M 1/34* (2013.01); *G01M 1/16* (2013.01)

(58) Field of Classification Search
CPC ............ G01M 1/34; G01M 1/16; G01M 1/14; G01M 1/22; G01M 1/225
USPC ........................... 73/460, 462, 468, 457, 458
See application file for complete search history.

(56) References Cited

U.S. PATENT DOCUMENTS

| | | | | |
|---|---|---|---|---|
| 3,037,403 A | * | 6/1962 | Hack ....................... | B23B 41/00 408/2 |
| 4,464,934 A | * | 8/1984 | Giers ....................... | G01M 1/22 73/462 |
| 4,545,021 A | * | 10/1985 | Suzuki ..................... | F16F 15/10 700/279 |
| 5,208,758 A | * | 5/1993 | Okumura ................ | G01M 1/22 700/279 |

FOREIGN PATENT DOCUMENTS

| | | | |
|---|---|---|---|
| GB | 897064 | * | 5/1962 |
| JP | 10-307071 A | | 11/1998 |
| JP | 2001-083033 A | | 3/2001 |

OTHER PUBLICATIONS

Office Action dated Nov. 2, 2020 in corresponding Chinese Application No. 201910197828.3; 14 pages including English-language translation.
Tongying et al., "Automatic Dynamic Balance Research and Realization of Cross-flow Fan by NC Drilling", Machine Tool & Hydraulics, vol. 44., No. 17, Sep. 30, 2016, 11 pages.

* cited by examiner

*Primary Examiner* — Robert R Raevis
(74) *Attorney, Agent, or Firm* — Maier & Maier, PLLC

(57) ABSTRACT

A dynamic balancing test and correction apparatus capable of shortening the time required for correcting imbalance in a correction part and improving the entire workflow of the apparatus.

7 Claims, 16 Drawing Sheets

DYNAMIC BALANCING TEST AND CORRECTION APPARATUS

TECHNICAL FIELD

The present invention relates to a dynamic balancing test and correction apparatus that, after performing a dynamic balancing test on a workpiece provided with a rotating shaft, corrects imbalance on the basis of the result of the dynamic balancing test.

BACKGROUND ART

In a conventional dynamic balancing machine, imbalance signals generated by rotating a workpiece provided with a rotating shaft are detected by vibration detecting sensors (pickups) respectively arranged on left and right bearings supporting the rotating shaft of the workpiece at both ends. Then, from the amplitude values of the detected imbalance signals, the magnitude of the imbalance between both of the left and right surfaces of the workpiece is obtained. Also, the direction (angle) of the imbalance between both of the left and right surfaces of the workpiece is obtained on the basis of a rotation reference pulse obtained by using a non-contact sensor to detect a rotation reference position such as a mark attached on a surface of the workpiece, and the phase relationship between the left and right imbalance signals (see Patent Literature 1).

In addition, a conventional imbalance correction apparatus has a configuration that obtains a balance by, on the basis of the magnitude and direction of imbalance detected by a dynamic balancing machine, performing hole drilling on paired correction surfaces facing a direction orthogonal to a rotating shaft of a workpiece (see Patent Literature 2).

When performing the hole drilling using such a correction apparatus, a configuration that fixes the workpiece in a predetermined position with a holding member holding the workpiece, as well as moves drilling mechanisms respectively independently in mutually orthogonal two directions in a plane orthogonal to the rotating shaft of the workpiece, and performs the hole drilling from one of the correction surfaces of the workpiece can be employed (see FIG. 11 of Patent Literature 2). Alternatively, a configuration that fixes the workpiece in the predetermined position with the holding member holding the workpiece, as well as makes the drilling mechanisms arranged on both sides of the workpiece simultaneously perform the hole drilling from both of the correction surfaces of the workpiece may be employed (see FIG. 1 of Patent Literature 2).

On the other hand, when performing hole drilling at angle positions different between one correction surface and the other correction surface in an imbalance correction apparatus that performs hole drilling from both sides of a workpiece, a correction apparatus including a rotation mechanism adapted to rotate the workpiece around a rotating shaft of the workpiece is used. Such a correction apparatus has a configuration that performs hole drilling on a first correction surface of a workpiece using a first drilling mechanism, and after making the rotation mechanism rotate the workpiece to change the rotation angle position of the workpiece, performs hole drilling on a second correction surface on the side opposite to the first correction surface of the workpiece using a second drilling mechanism.

CITATION LIST

Patent Literatures

Patent Literature 1: Japanese Unexamined Patent Application Publication No. 2001-83033

Patent Literature 2: Japanese Unexamined Patent Application Publication No. Hei 10-307071

SUMMARY OF INVENTION

Technical Problem

When performing hole drilling at angle positions different between one correction surface and the other correction surface in an imbalance correction apparatus that performs hole processing from both sides of a workpiece, it is necessary to perform the hole drilling on the one correction surface of the workpiece, and then after rotating the workpiece, perform the hole drilling on the other correction surface of the workpiece. For this reason, there arises a problem of taking time to correct imbalance.

In general, the above-described dynamic balancing machine and correction apparatus are used as a pair, and adapted to, while performing a dynamic balancing test on some workpiece, perform imbalance correction work on another workpiece, and then convey the workpiece whose imbalance has been corrected to the dynamic balancing machine again to perform the dynamic balancing test. In such a case, if the imbalance correction work requires a time equal to or more than the time required for the dynamic balancing test, there arises a problem of impairing the entire workflow.

The present invention has been made in order to solve the above-described problems, and intends to provide a dynamic balancing test and correction apparatus that includes a dynamic balancing test part and a correction part and is capable of shortening the time required for imbalance correction in the correction part to improve the entire workflow of the apparatus.

Solution to Problem

An embodiment of the present invention is a dynamic balancing test and correction apparatus including: a dynamic balancing test part that includes a rotation mechanism adapted to rotate a workpiece provided with a rotating shaft around a shaft center of the rotating shaft and measures a direction and an amount of imbalance of the workpiece by rotation of the workpiece; and a correction part that, on a basis of the direction and the amount of the imbalance of the workpiece measured by the dynamic balancing test part, performs hole drilling on paired correction surfaces of the workpiece facing a direction orthogonal to the rotating shaft, and thereby corrects the imbalance of the workpiece. In addition, the correction part includes: a support part that, in a resting state, supports the workpiece whose imbalance has been measured by the dynamic balancing test part; paired drilling mechanisms that are for performing the hole drilling on the paired correction surfaces of the workpiece supported by the support part, disposed on both sides of the workpiece, and movable in a direction parallel to the rotating shaft of the workpiece; and a moving mechanism that moves the paired drilling mechanisms respectively independently in mutually orthogonal two directions in a plane orthogonal to the rotating shaft of the workpiece.

According to such an embodiment, by moving the paired drilling mechanisms disposed on both sides of the workpiece respectively independently in mutually orthogonal two directions in the plane orthogonal to the rotating shaft of the workpiece, the hole drilling can be simultaneously performed on the paired correction surfaces of the workpiece.

Accordingly, the time required for the imbalance correction can be shortened to improve the entire workflow of the apparatus.

In one preferred embodiment, the dynamic balancing test and correction apparatus includes a workpiece sandwiching mechanism that, when the drilling mechanisms perform the hole drilling, fixes the workpiece by sandwiching the paired correction surfaces of the workpiece. Also, in one preferred embodiment, the dynamic balancing test and correction apparatus includes a workpiece fixing mechanism that, when the paired drilling mechanisms perform the hole drilling, fixes the workpiece by pressing the workpiece in a direction parallel to the paired correction surfaces.

According to such embodiments, when simultaneously performing the hole drilling on the paired correction surfaces of the workpiece, a reduction in the positional accuracy of the hole drilling can be prevented by preventing the workpiece from moving.

In one other preferred embodiment, the dynamic balancing test and correction apparatus further includes: a conveyance part that conveys the workpiece between the dynamic balancing test part and the correction part; and a stop position control part that controls the rotation mechanism so that, when the workpiece whose imbalance has been measured by the dynamic balancing test part is conveyed to the correction part by the conveyance part and supported by the support part, an angle position of the workpiece coincides with an angle position suitable for the hole drilling by the paired drilling mechanism, and controls a stop position after rotation of the workpiece after the imbalance has been measured by the dynamic balancing test part and before the conveyance by the conveyance part.

In still one other preferred embodiment, the stop position control part controls the rotation mechanism so that, when the workpiece whose imbalance has been measured by the dynamic balancing test part is conveyed to the correction part by the conveyance part and supported by the support part, a hole drilling position of the workpiece coincides with an angle position incoincident with a position to sandwich the workpiece by the workpiece sandwiching mechanism, and controls a stop position after the rotation of the workpiece after the imbalance has been measured by the dynamic balancing test part and before the conveyance by the conveyance part.

In yet one other preferred embodiment, the stop position control part controls the rotation mechanism so that, when the workpiece whose imbalance has been measured by the dynamic balancing test part is conveyed to the correction part by the conveyance part and supported by the support part, a hole drilling position of the workpiece coincides with an angle position where the rotating shaft of the workpiece and the drilling mechanisms do not interfere with each other, and controls the stop position after the rotation of the workpiece after the imbalance has been measured by the dynamic balancing test part and before the conveyance by the conveyance part.

According to the other preferred embodiments, the angle position after the rotation of the workpiece after the imbalance has been measured by the dynamic balancing test part and before the conveyance by the conveyance part can be made to coincide with the angle position suitable for the hole drilling by the paired drilling mechanisms. This makes it possible to perform the hole drilling on the workpiece conveyed on the correction part without changing a position.

DESCRIPTION OF EMBODIMENTS

Figure 1:
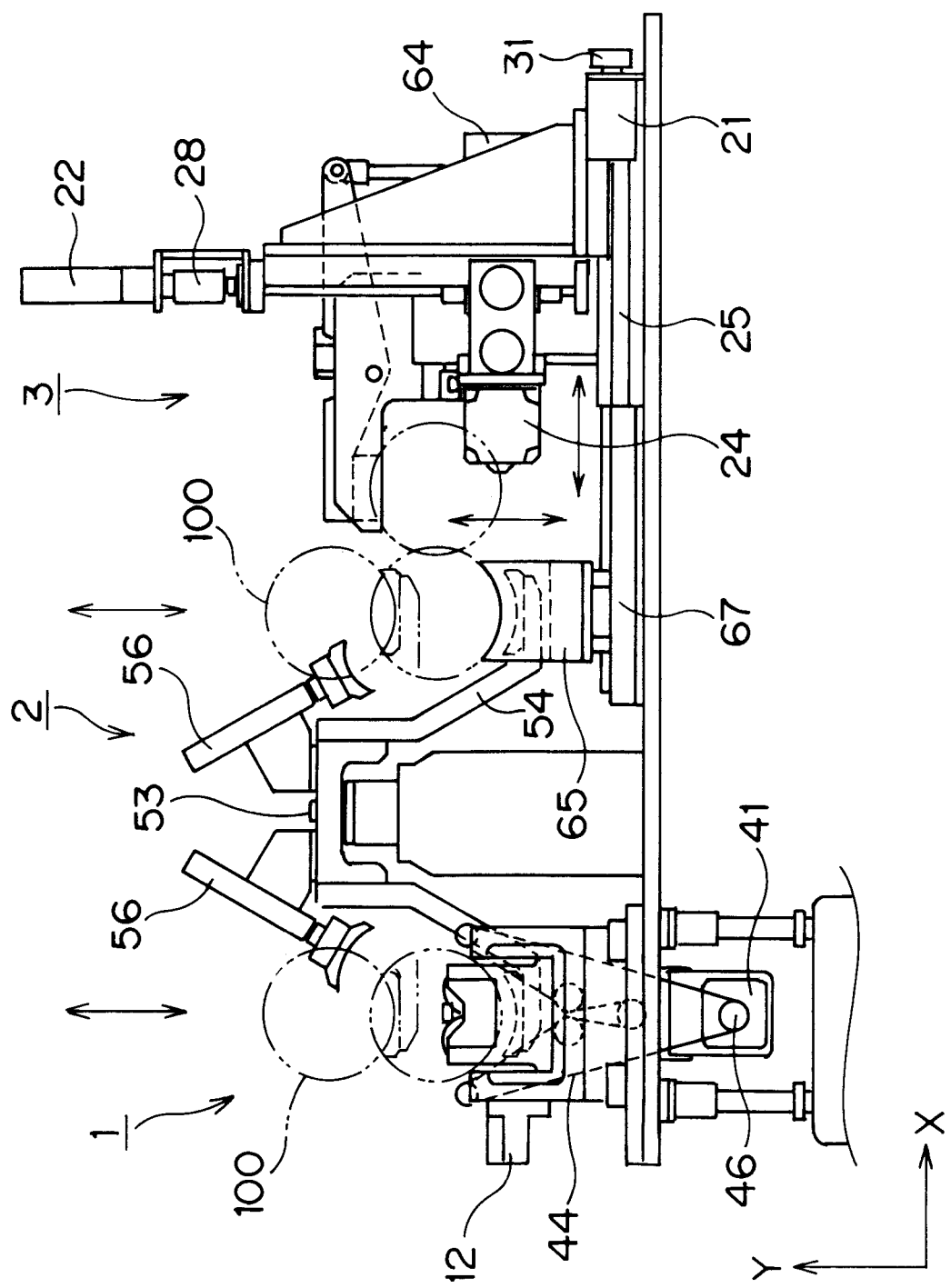
FIG. 1 is a side view of a dynamic balancing test and correction apparatus according to the present invention.
Figure 2:
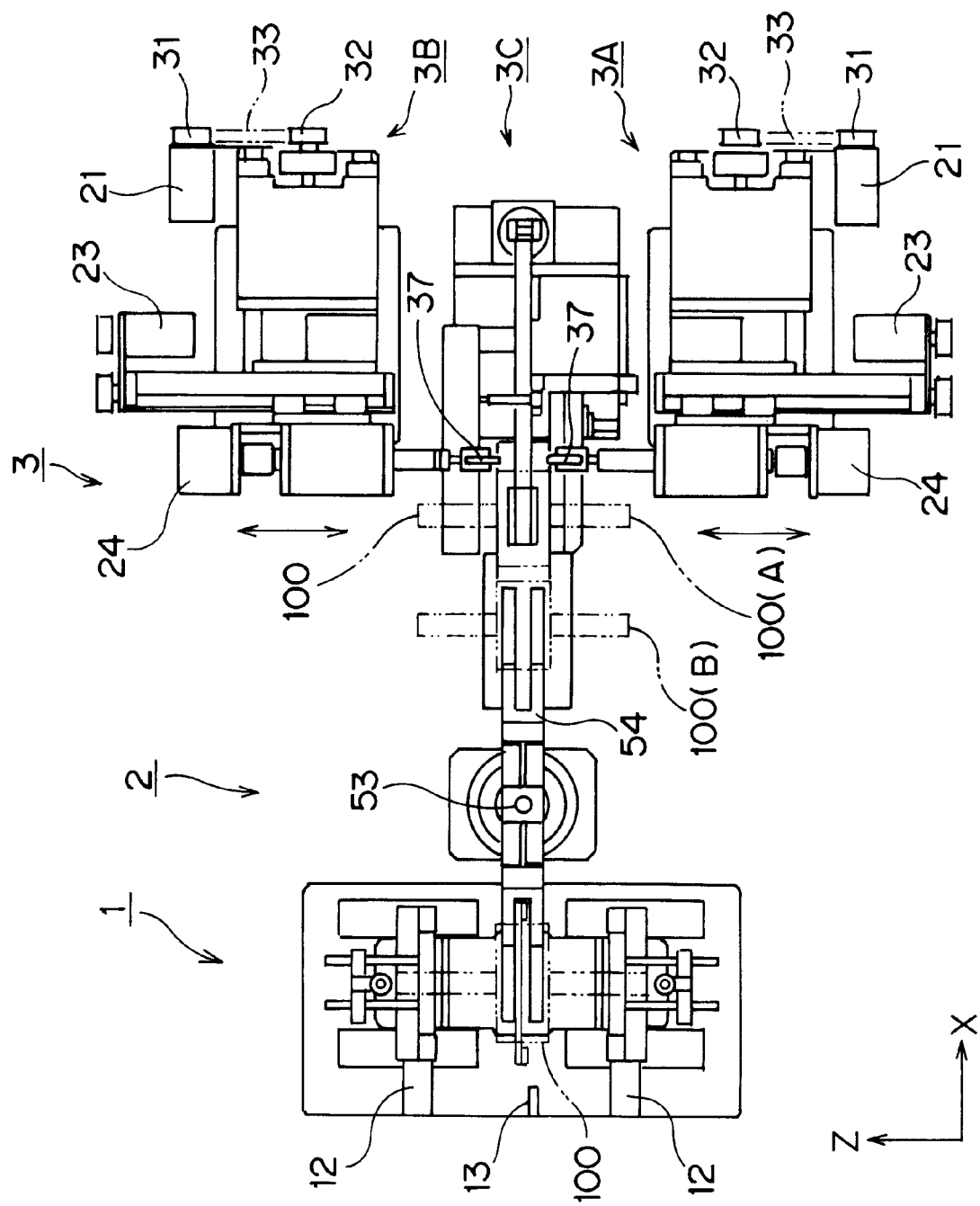
FIG. 2 is a plan view of the dynamic balancing test and correction apparatus according to the present invention.

In the following, embodiments of the present invention will be described on the basis of the drawings. FIG. 1 is a side view of a dynamic balancing test and correction apparatus according to the present invention, and FIG. 2 is a plan view of the dynamic balancing test and correction apparatus.

The dynamic balancing test and correction apparatus includes: a dynamic balancing test part 1 that measures the direction and amount of imbalance of a workpiece 100 provided with a rotating shaft 102; a correction part 3 that, on the basis of a direction and an amount of imbalance of the workpiece 100 measured by the dynamic balancing test part 1, performs hole drilling on the paired correction surfaces of the workpiece 100 to thereby correct the imbalance; and a conveyance part 2 that conveys the workpiece 100 between the dynamic balancing test part 1 and the correction part 3. In addition, as illustrated in FIG. 2, the correction part 3 is configured to include paired drilling mechanisms 3A and 3B and a support part 3C.

Figure 3:
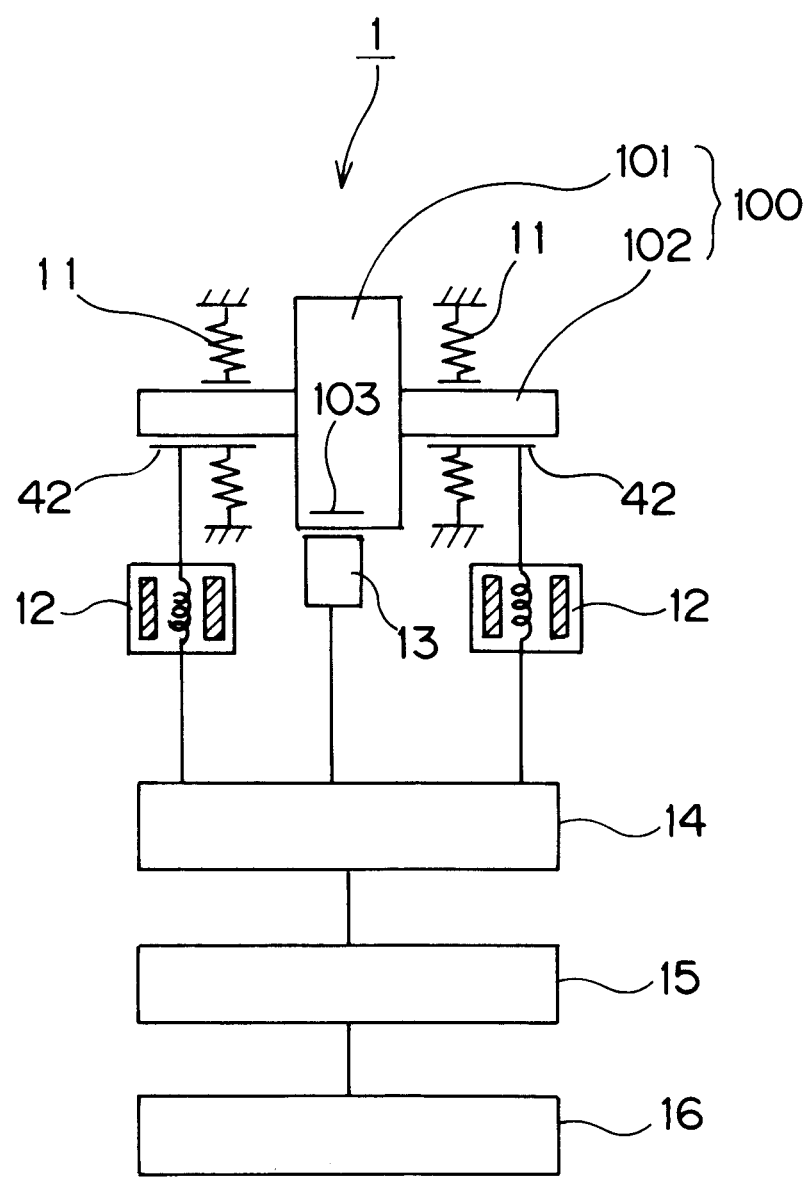
FIG. 3 is a block diagram illustrating a control system of a dynamic balancing test part 1.

FIG. 3 is a block diagram illustrating a control system of the dynamic balancing test part 1 that measures the direction and amount of imbalance.

A workpiece 100 as a measurement target includes a workpiece body 101 and a rotating shaft 102. The paired flat surface parts of the workpiece body 101 of a cylindrical shape are the correction surfaces to be subjected to the below described hole drilling. Also, the cylindrically-shaped workpiece body 101 is formed with a mark 103 for recognizing the rotation angle position of the workpiece 100. The mark 103 may be a seal put on the workpiece body 101.

The rotating shaft 102 of the workpiece 100 is supported by rollers 42 displaceably supported by an apparatus body via springs 11 and rotated around the shaft center of the rotating shaft 102 by driving of the below described belts 44. Along with the rotation of the workpiece 100, a support mechanism including the respective rollers 42 is vibrated by imbalance present in the workpiece 100. This vibration is detected by vibration detecting sensors 12 of a moving coil type, and the outputs of the respective vibration detecting sensor 12 are inputted to an imbalance calculation part 14 as imbalance signals about the left and right surfaces of the workpieces 100. Also, in parallel with this, the mark 103 formed on the workpiece 100 is detected by a laser sensor 13. Then, on the basis of the resulting detected signal, the rotation reference pulse of the workpiece 100 is created.

The imbalance calculation part 14 calculates the magnitude of the imbalance between the left and right surfaces present in the workpiece 100 from the amplitude values of the imbalance signals, and also from the phase relationships between the respective imbalance signals and the rotation reference pulse, calculates the direction (angle) of the imbalance between the left and right surfaces. A drilling position calculation part 15 calculates, on the basis of the magnitude and direction of the imbalance, a position to perform hole drilling on the workpiece 100 in the correction part 3. Also, a stop position control part 16 controls, on the basis of the position to perform the hole drilling, which has been calculated by the drilling position calculation part 15, and the mechanical configuration of the correction part 3, a stop position after the rotation of the workpiece 100 after the imbalance has been measured by the dynamic balancing test part 1 and before conveyance by the conveyance part 2. More specifically, the stop position control part 16 calculates the angle position of the workpiece 100 suitable for the hole drilling, and when the stop position after the rotation of the workpiece 100 after the imbalance has been measured by the dynamic balancing test part 1 and before the conveyance by the conveyance part 2 coincides with the angle position suitable for the hole drilling, stops the rotation of the workpiece 100.

In addition, the imbalance calculation part 14, the drilling position calculation part 15, and the stop position control part 16 are configured by a computer installed with software. The respective types of functions of the imbalance calculation part 14, the drilling position calculation part 15, and the stop position control part 16 are implemented by executing the software installed in the computer.

Figure 4:
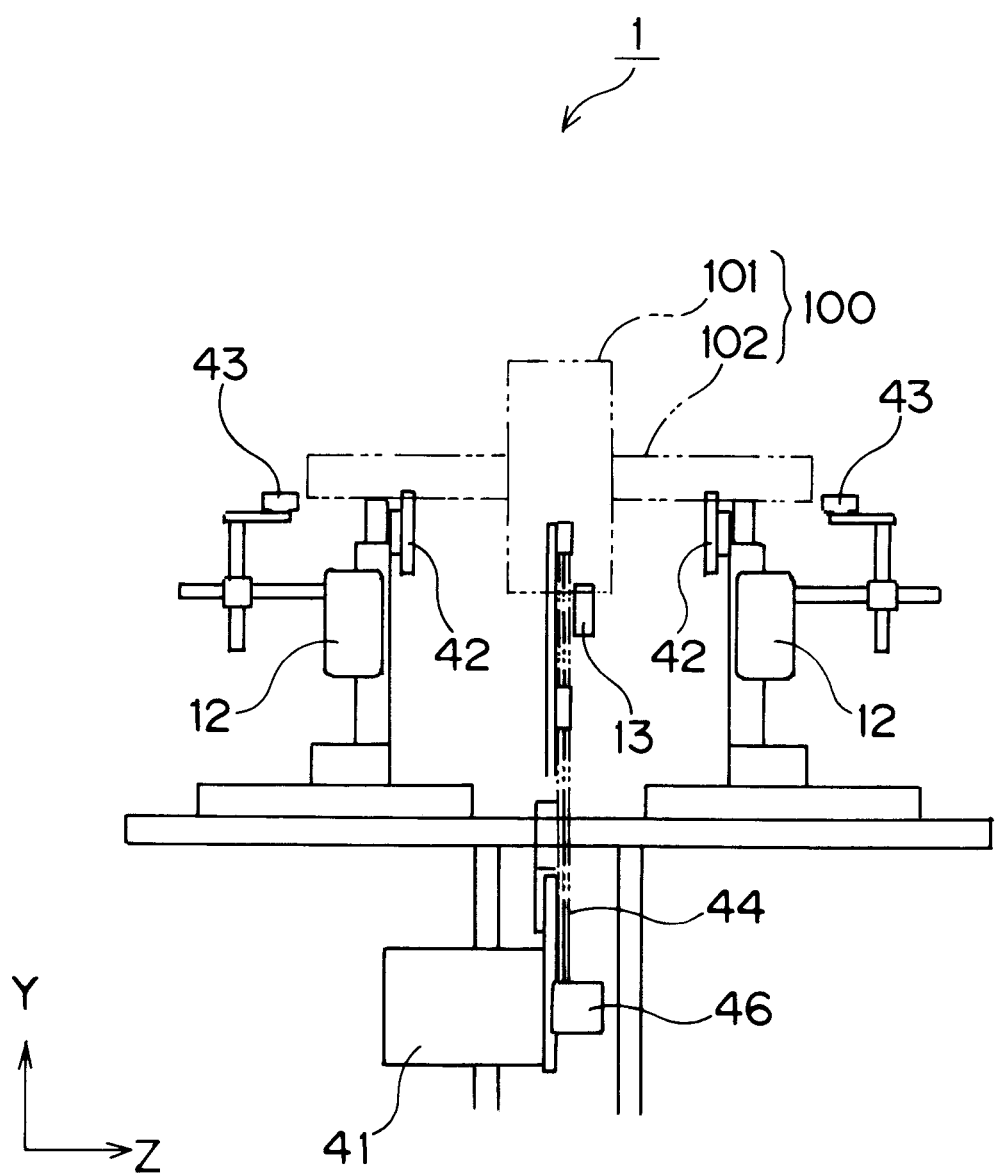
FIG. 4 is a front view of the dynamic balancing test part 1.
Figure 5:
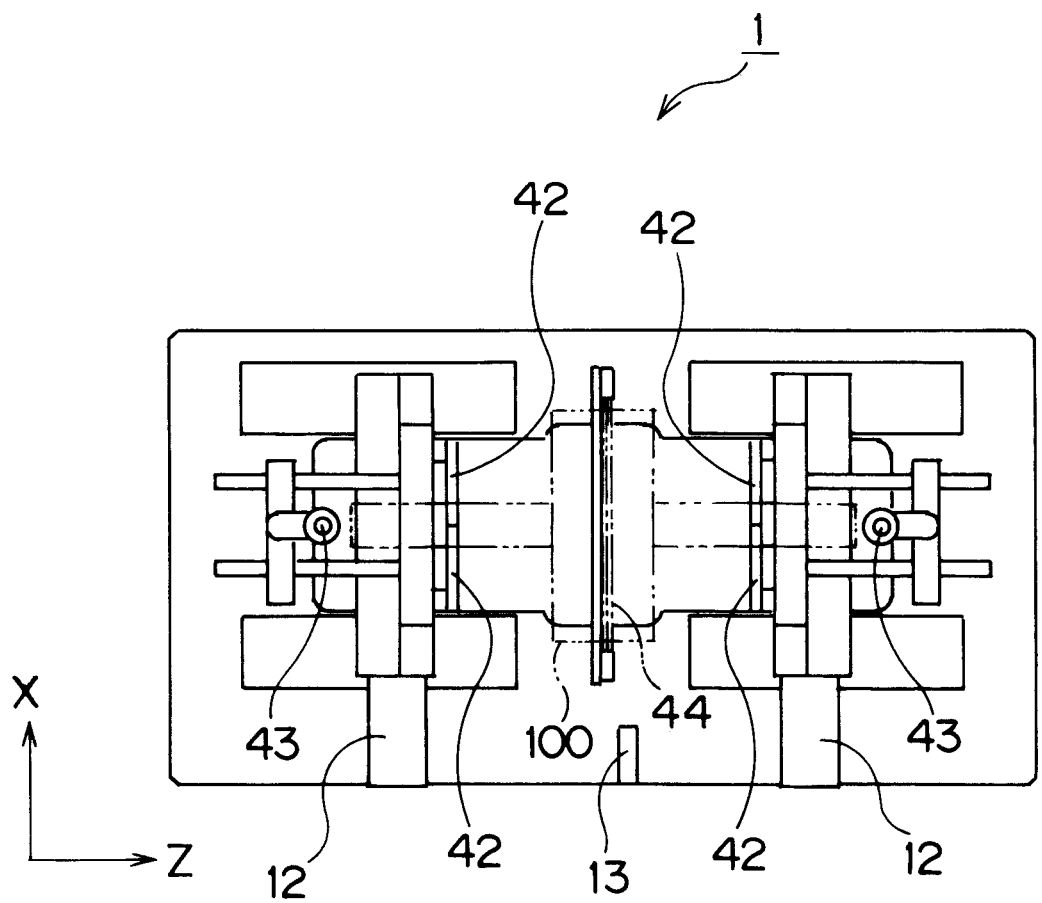
FIG. 5 is a plan view of the dynamic balancing test part 1.
Figure 6:
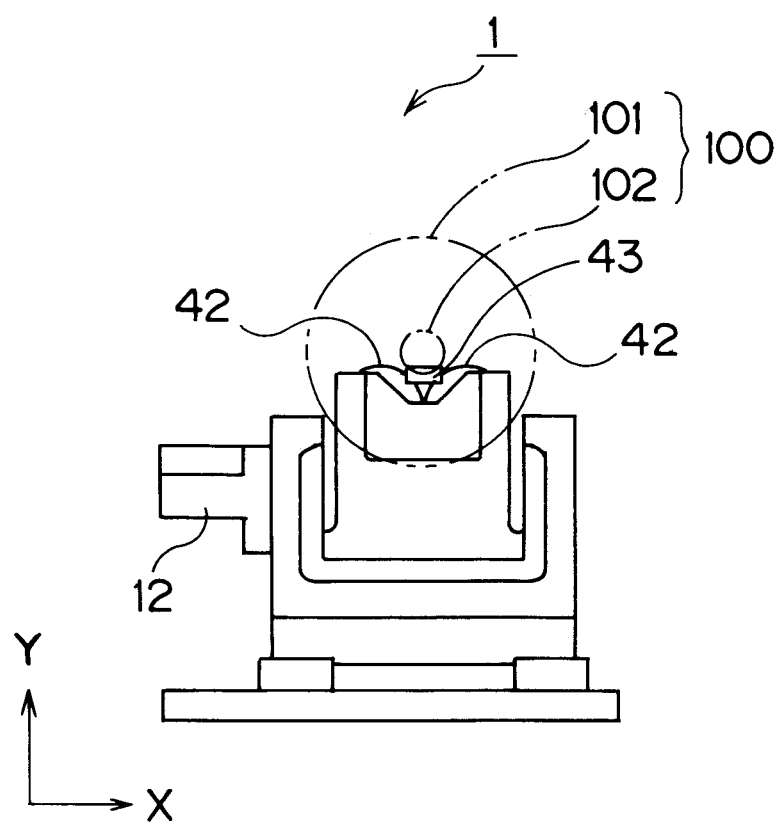
FIG. 6 is a side view of the dynamic balancing test part 1.
Figure 7:
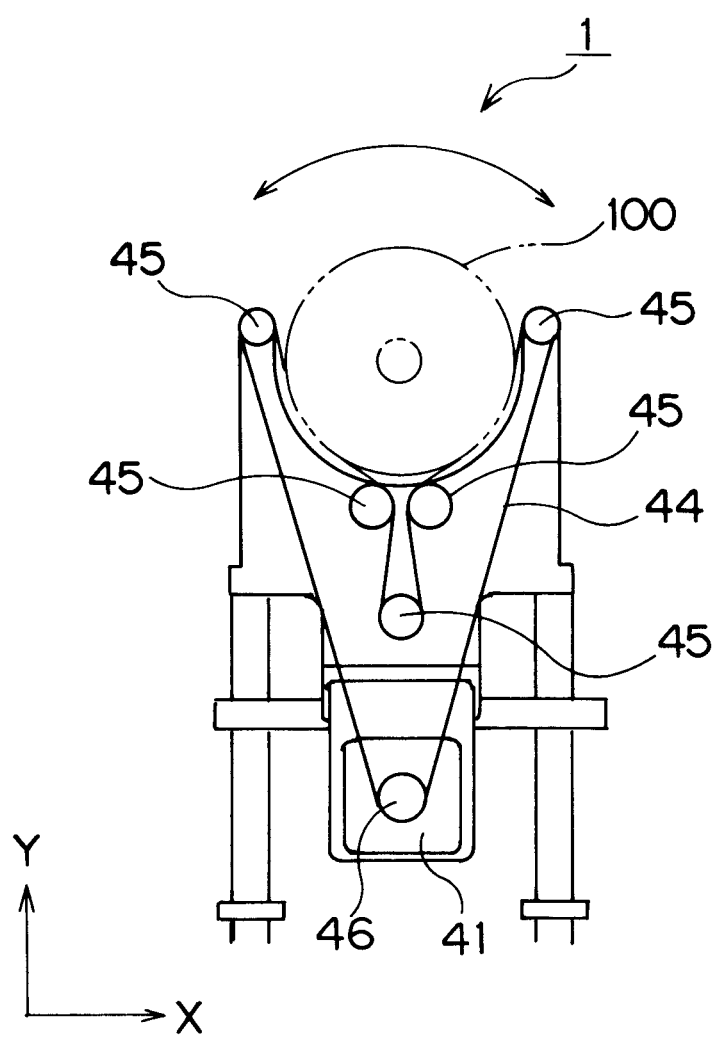
FIG. 7 is a side view illustrating a rotation mechanism in the dynamic balancing test part 1.

FIG. 4 is a front view of the dynamic balancing test part 1. FIG. 5 is a plan view of the dynamic balancing test part 1. FIG. 6 is a side view of the dynamic balancing test part 1. FIG. 7 is a side view illustrating the rotation mechanism in the dynamic balancing test part 1.

The rotating shaft 102 of the workpiece 100 is adapted to be rotatable supported by the paired rollers 42 on both sides thereof. Also, positions in the shaft center direction of the rotating shaft 102 of the workpiece 100 are restricted by paired left and right position restriction rollers 43. As described above, the vibration of the support mechanism including the respective rollers 42 caused by the imbalance present in the workpiece 100 is detected by the paired left and right vibration detecting sensors 12. Also, the mark 103 formed on the workpiece 100 is detected by the laser sensor 13.

As illustrated in FIGS. 4 and 7, the dynamic balancing test part 1 has the rotation mechanism that includes: a driving pulley 46 connected to a servo motor 41; multiple driven pulleys 45, and the belts 44 of an endless shape wound on the driving pulley 46 and the driven pulleys 45, and rotates the workpiece 100 around the shaft center of the rotating shaft 102. The belts 44 are ones made of resin, and disposed mutually parallel as a pair. Also, the rotation mechanism is adapted to be movable up and down by driving of an unillustrated cylinder between a rotation position illustrated in FIG. 7 where the belts 44 are in contact with the workpiece body 101 of the workpiece 100 supported by the rollers 42 and a retracted position separated downward from the rotation position. When the belts 44 are moved by driving of the servo motor 41 in a state where the rotation mechanism is arranged in the rotation position illustrated in FIG. 7, the workpiece 100 in contact with the belts 44 rotates around the shaft center of the rotating shaft 102. In addition, the stop position of the workpiece 100 after the rotation is controlled by the stop position control part 16 illustrated in FIG. 3.

Figure 8:
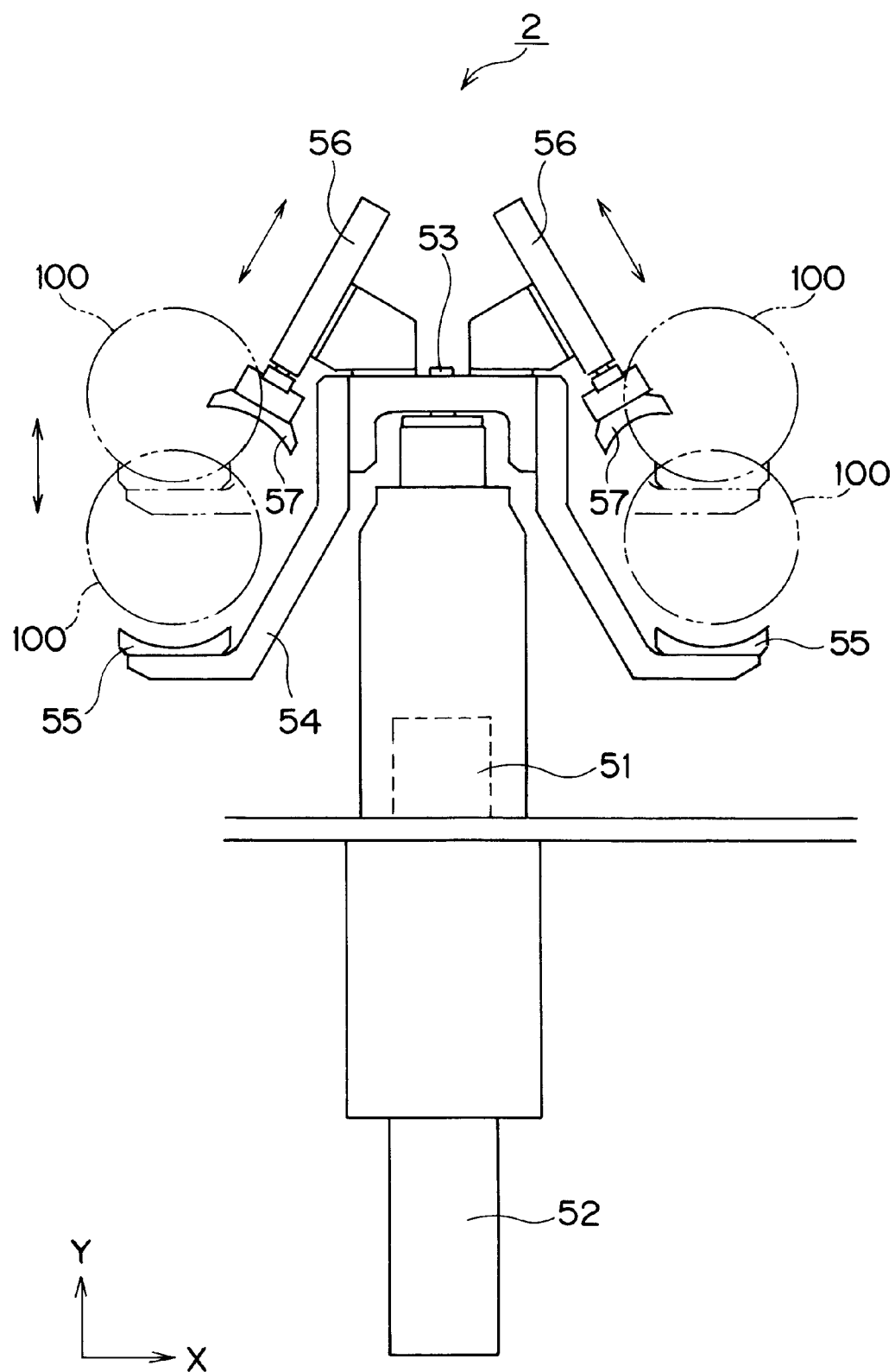
FIG. 8 is a side view of a conveyance part 2.
Figure 9:
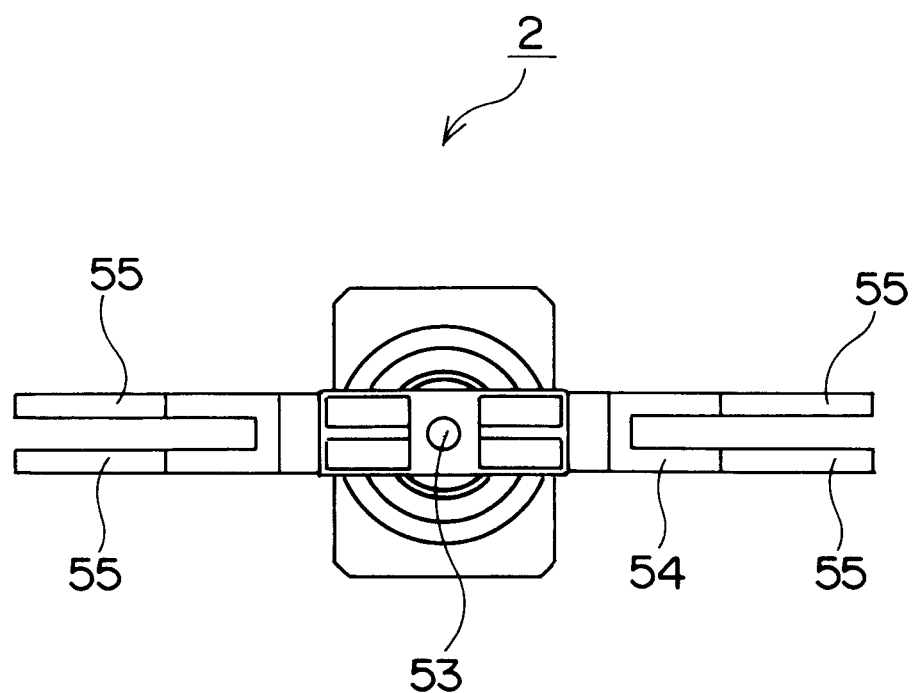
FIG. 9 is a plan view of the conveyance part 2.

FIG. 8 is a side view of the conveyance part 2, and FIG. 9 is a plan view of the conveyance part 2.

The conveyance part 2 is one for receiving/delivering a workpiece 100 between the dynamic balancing test part 1 and the correction part 3, and is moved up and down by driving of an air cylinder 52, as well as has an arm 54 that is rotationally moved around a shaft 53 by driving of a motor 51. At both ends of the arm 54, paired support parts 55 for supporting the workpiece 100 from the lower surface are respectively disposed. Also, fixing members 57 that are reciprocated by driving of air cylinders 56 and for pressing and fixing workpieces 100 supported by the support parts 55 are disposed.

The arm 54 moves up while simultaneously supporting a workpiece 100 supported by the rollers 42 in the above-described dynamic balancing test part 1 and a workpiece 100 placed on the below-described workpiece table 65 in the correction part 3 from their lower sides, then after rotating around the shaft 53 by 180 degrees, moves down, and thereby places the workpiece 100 supported by the rollers 42 on the workpiece table 65, as well as makes the rollers 42 support the workpiece 100 supported on the workpiece table 65.

Figure 10:
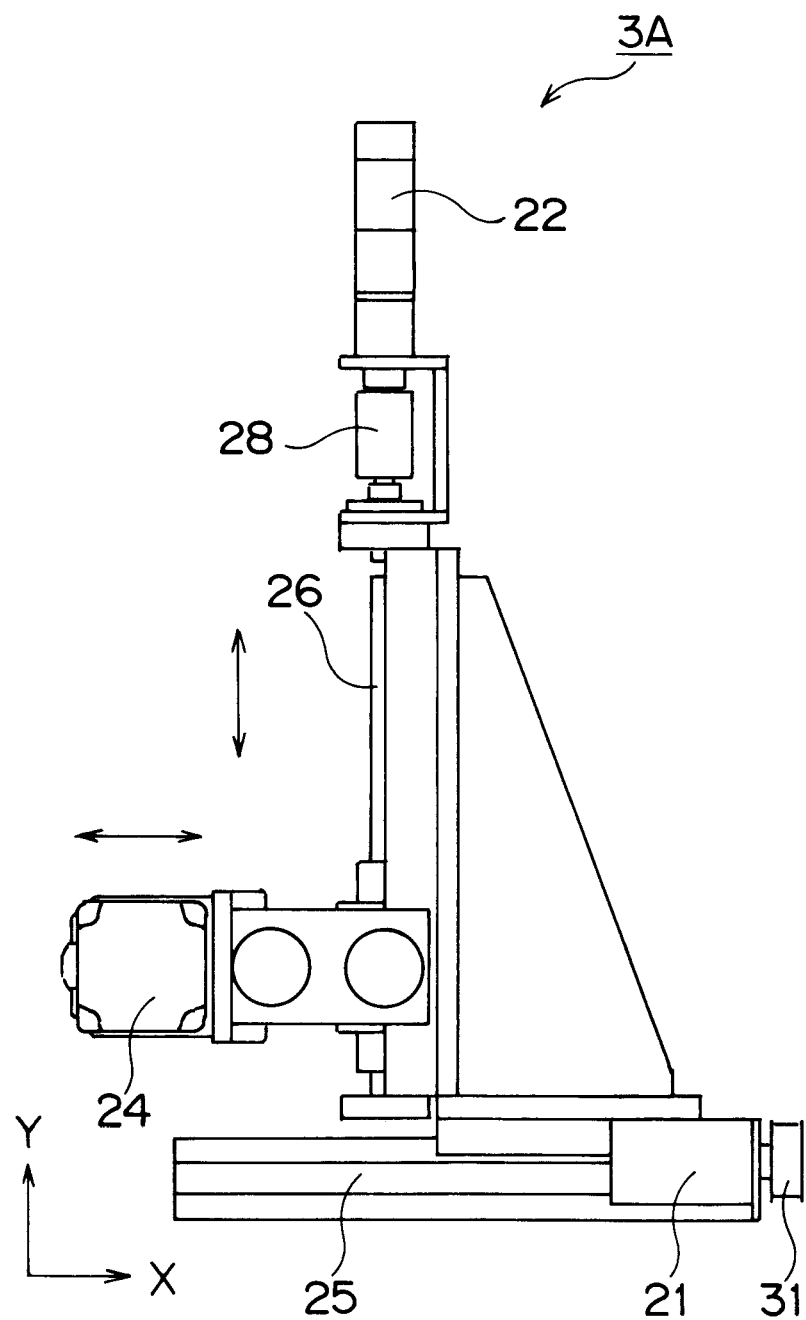
FIG. 10 is a side view of a drilling mechanism 3A in a correction part 3.
Figure 11:
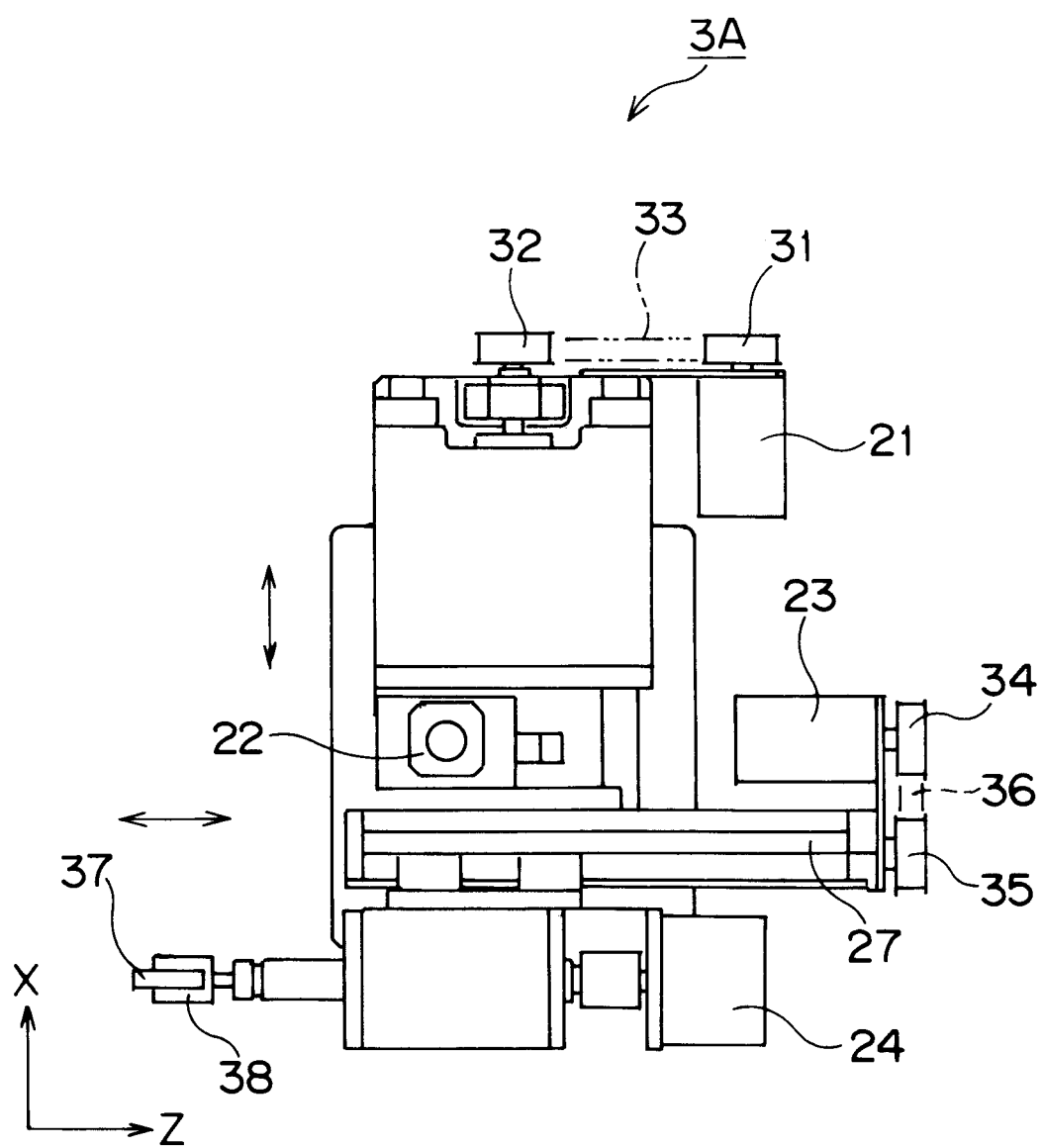
FIG. 11 is a plan view of the drilling mechanism 3A in the correction part 3.
Figure 12:
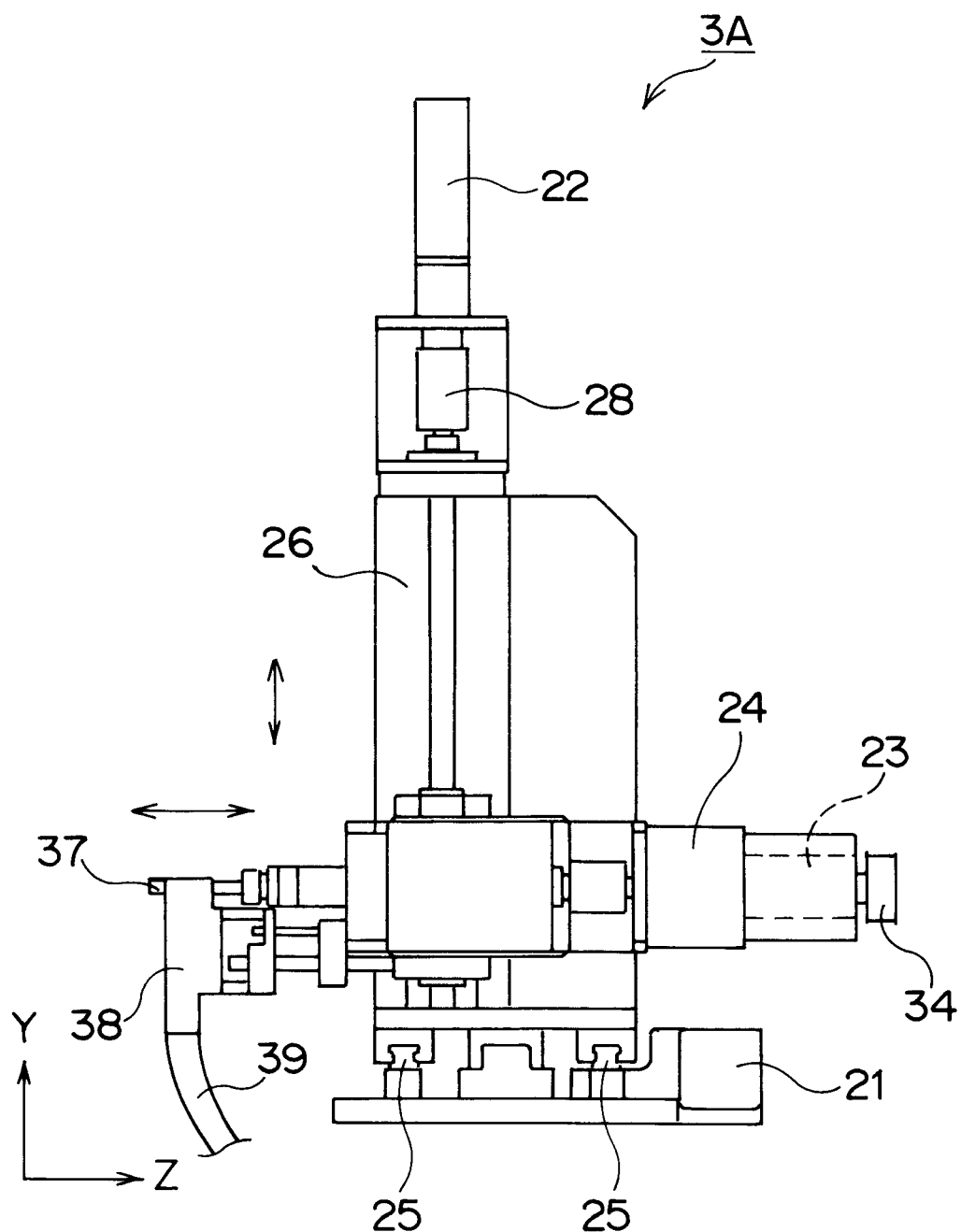
FIG. 12 is a front view of the drilling mechanism 3A in the correction part 3.

FIG. 10 is a side view of the drilling mechanism 3A in the correction part 3, FIG. 11 is a plan view of the drilling mechanism 3A, and FIG. 12 is a front view of the drilling mechanism 3A. Note that the other drilling mechanism 3B has the same configuration as that of the drilling mechanism 3A.

The drilling mechanism 3A in the correction part 3 includes a drill 37 that is rotated by driving of a motor 24. On the outer circumferential part of the drill 37, a dust collecting part 38 for collecting dust discharged from a workpiece 100 at the time of the below-described hole drilling is disposed. The dust collecting part 38 is fluidly connected to an exhaust mechanism via a hose 39 so that gas can be circulated. In addition, in place of the drill 37, an end mill or the like may be used. The drilling mechanism in this specification is a concept also including various typed of configurations for performing the hole drilling that is machining for forming a concave part in a correction surface of the workpiece 100 using a drill, an end mill, or the like.

The drill 37 and the dust collecting part 38 are adapted to be movable in a reciprocating manner in an X-direction while being guided by guide members 25 (see FIGS. 10 and 12), and moved in the X-direction by rotation of an X-directional drive shaft mechanically connected to a motor 21 via a synchronization pulley 31, synchronization belt 33, and synchronization pulley 32. Also, the drill 37 and the dust collecting part 38 are adapted to be movable in a reciprocating manner in a Y-direction while being guided by a guide member 26 (see FIGS. 10 and 12), and moved in the-Y direction by rotation of a Y-directional drive shaft mechanically connected to a motor 22 via a coupling 28. Further, the drill 37 and the dust collecting part 38 are adapted to be movable in a reciprocating manner in a Z-direction while being guided by a guide member 27 (see FIG. 11), and moved in the Z-direction by rotation of a Z-directional drive shaft mechanically connected to a motor 23 via a synchronization pulley 34, a synchronization belt 36, and a synchronization pulley 35.

Figure 13:
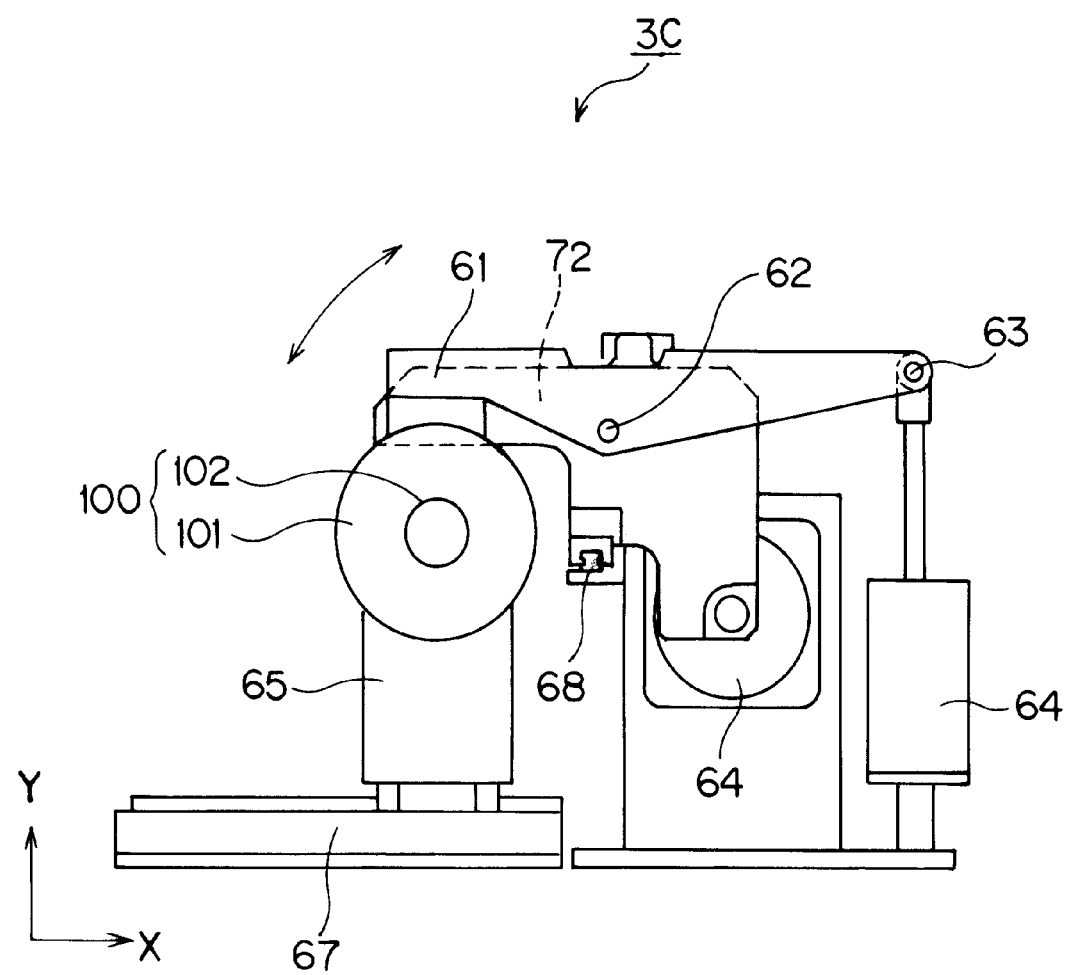
FIG. 13 is a side view of a support part 3C in the correction part 3.
Figure 14:
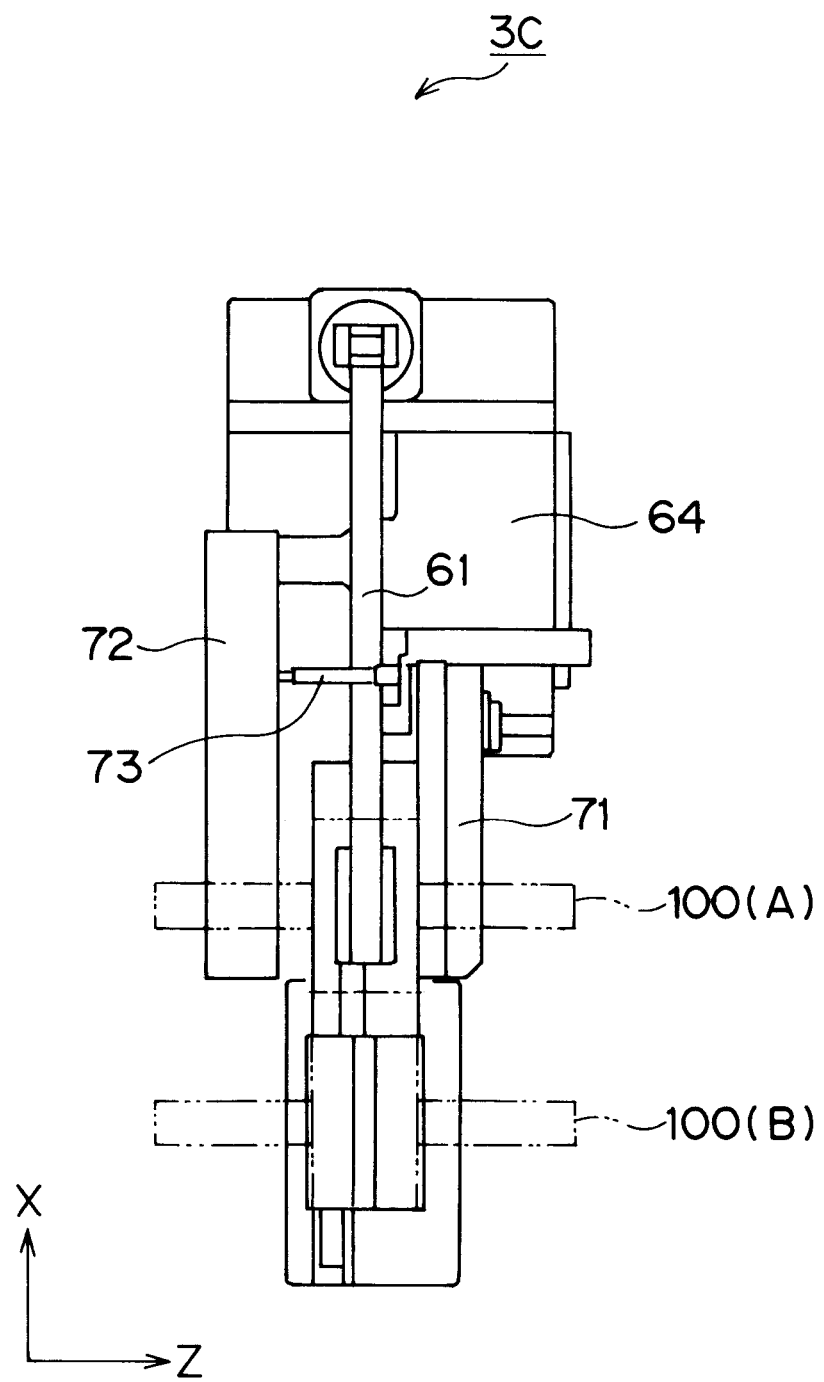
FIG. 14 is a plan view of the support part 3C in the correction part 3.
Figure 15:
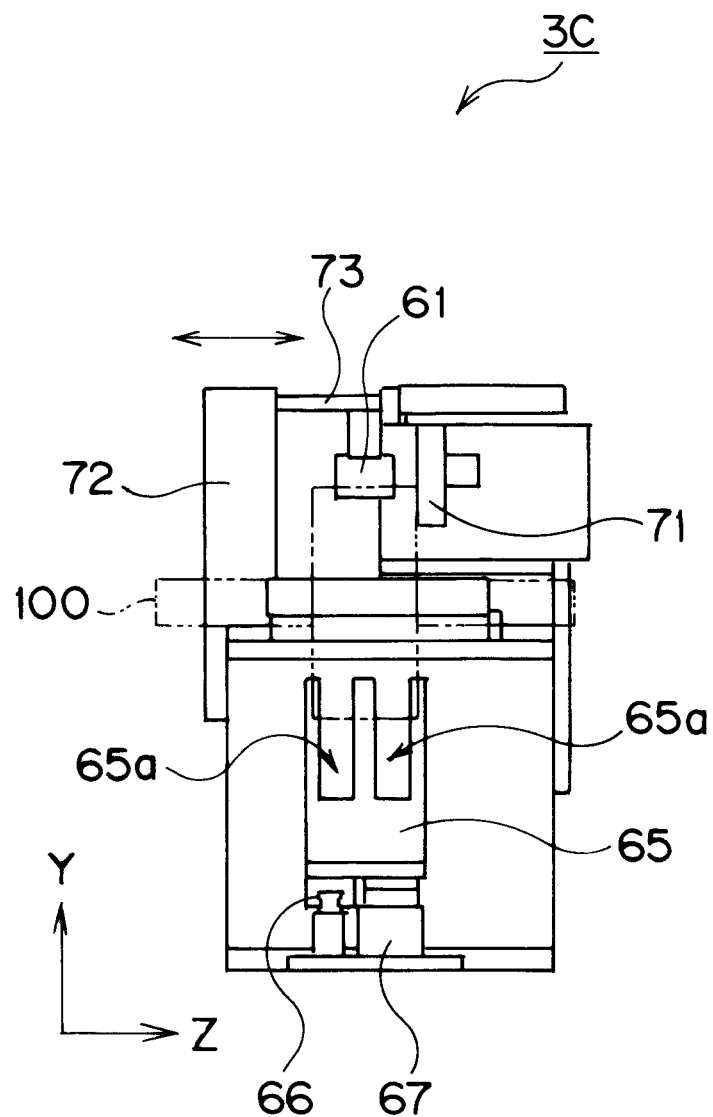
FIG. 15 is a front view of the support part 3C in the correction part 3.

FIG. 13 is a side view of the support part 3C in the correction part 3, FIG. 14 is a plan view of the support part 3C, and FIG. 15 is a front view of the support part 3C. In addition, FIG. 13 illustrates a state where a first sandwiching member 71 is detached.

The support part 3C includes the workpiece table 65 for receiving the workpiece 100 from any of the paired support parts 55 disposed at both ends of the arm 54 in the conveyance part 2. In a support area for the workpiece 100 on the workpiece table 65, paired concave areas 65a insertable with paired support parts 55 at a fore end of the arm 54 are formed as illustrated in FIG. 15. The workpiece table 65 is adapted to be movable in the X-direction while being guided by a guide 66 (see FIG. 15), and moved in a reciprocating manner in the Z-direction by driving of a rodless cylinder 67. That is, the workpiece table 65 is adapted to be movable in a reciprocating manner between a conveyance position (indicated by a symbol 100(B) in FIG. 2) to receive/deliver the workpiece 100 from/to support parts 55 at a fore end of the arm 54 illustrated in FIG. 1 and a drilling position (indicated by a symbol 100(A) in FIG. 2) to perform hole drilling on the workpiece 100 illustrated in FIG. 13.

Also, the support part 3C includes a workpiece sandwiching mechanism that, when the drilling mechanisms 3A and 3B perform hole drilling, sandwiches the paired correction surfaces of a workpiece 100 to thereby fix the workpiece 100. The workpiece sandwiching mechanism has: the first sandwiching member 71 serving as a reference surface; and a second sandwiching member 72 that is brought close to the first sandwiching member 71 or moved in a separating direction by driving of an air cylinder 64. When the drilling mechanisms 3A and 3B perform hole drilling, the drilled surfaces of the workpiece 100 is sandwiched by the first sandwiching member 71 and the second sandwiching member 72, and thereby the workpiece 100 is fixed.

In addition, the support part 3C is disposed with a length measuring sensor 73 for detecting the position of the surface of the second sandwiching member 72 on the workpiece 100 side when the workpiece 100 is sandwiched. The support part 3C employs a configuration that, by making the length measuring sensor 73 detect the position of the surface of the second sandwiching part 72 on the workpiece 100 side, even when the distance between the correction surfaces of the workpiece 100 is uneven, detects the unevenness to control a hole drilling depth (the depth of a hole part to be formed) by the drilling mechanism 3B.

Further, the support part 3C includes a workpiece fixing mechanism that, when the drilling mechanisms 3A and 3B perform hole drilling, presses a workpiece 100 in a direction parallel to the paired correction surfaces to thereby fix the workpiece 100. The workpiece fixing mechanism has a pressing arm 61 that presses the workpiece 100 supported on the workpiece table 65 from above. The pressing arm 61 is adapted to be swingable around a shaft 62. Also, the end part on the side opposite to the workpiece 100 pressing part of the pressing arm 61 is connected to the cylinder rod of the air cylinder 64 via a shaft 63. For this reason, the pressing arm 61 is swung by driving of the air cylinder 64 between a pressing position to press the workpiece 100 from the upper side of the workpiece 100 along the correction surfaces of the workpiece 100 and a releasing position to release the workpiece 100.

Next, a series of dynamic balancing test and correction operations by the dynamic balancing test and correction apparatus having the above configuration will be described.

First, an operator places the rotating shaft 102 of the workpiece 100 to be subjected to the dynamic balancing test and correction operations on the paired left and right rollers 42 in the dynamic balancing test part 1. At this time, the rotation mechanism for the workpiece 100 illustrated in FIG. 7 is retracted downward by driving of an unillustrated air cylinder. Then, when the rotating shaft 102 of the workpiece 100 is placed on the rollers 42, the rotating mechanism for the workpiece 100 is moved up by driving of the unillustrated air cylinder, and as illustrated in FIG. 7, the belts 44 abut on the workpiece body 101 of the workpiece 100.

In this state, the workpiece 100 is rotated around the shaft center of the rotating shaft 102 by driving of the servo motor 41. Then, vibration caused by imbalance present in the workpiece 100 along with the rotation of the workpiece 100 is detected by the vibration detecting sensors 12, and the outputs of the respective vibration detecting sensors 12 are inputted to the imbalance calculation part 14 as the imbalance signals about the left and right surfaces of the workpiece 100. Also, in parallel with this, the mark 103 formed on the workpiece 100 is detected by the laser sensor 13. Then, on the basis of the resulting detected signal, the rotation reference pulse of the workpiece 100 is created.

The imbalance calculation part 14 illustrated in FIG. 3 calculates the magnitude of the imbalance present between the left and right surfaces of the workpiece 100 from the amplitude values of the imbalance signals, and also from the phase relationships between the respective imbalance signals and the rotation reference pulse, calculates the direction (angle) of the imbalance between the left and right surfaces. In addition, the drilling position calculation part 15 calculates, on the basis of the magnitude and direction of the imbalance, which positions of the correction surfaces of the workpiece 100 are to be subjected to hole drilling by the drilling mechanisms 3A and 3B in the correction part 3.

Then, on the basis of the positions calculated by the drilling position calculation part 15 and subjected to hole drilling, and the mechanical configuration of the correction part 3, the stop position control part 16 controls the stop position after the rotation of the workpiece 100 after the imbalance has been measured by the dynamic balancing test part 1 and before conveyance by the conveyance part 2. At this time, the stop position control part 16 controls the rotation amount of the servo motor 41 of the rotation mechanism illustrated in FIG. 7 to control the stop position after the rotation of the workpiece 100 so that the angle position of the workpiece 100 coincides with an angle position suitable for the hole drilling by the paired drilling mechanisms 3A and 3B.

Figure 16:
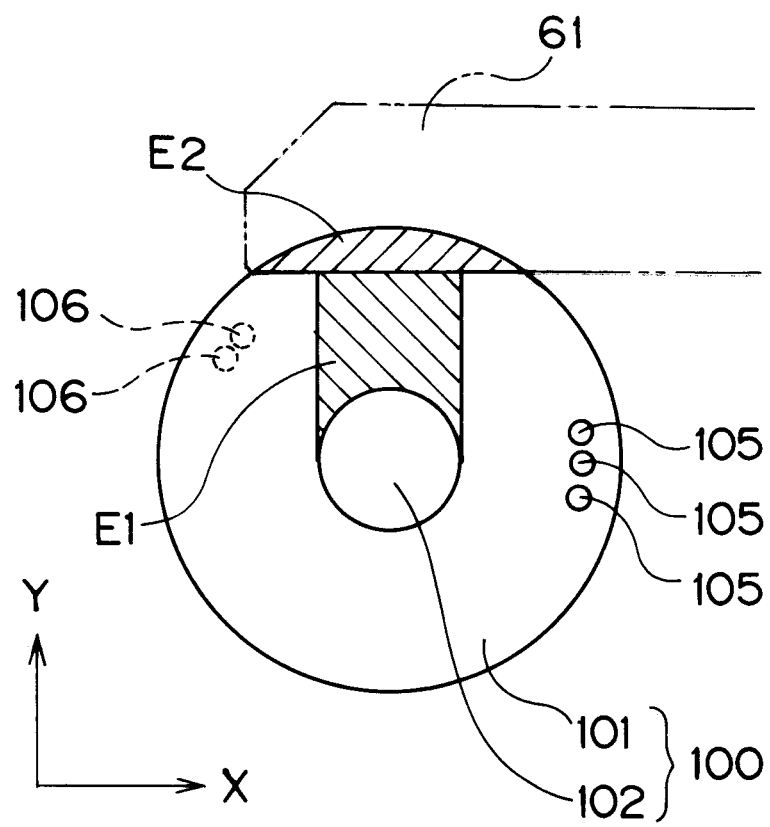
FIG. 16 is an explanatory diagram illustrating areas where hole drilling cannot be performed on a workpiece 100.

FIG. 16 is an explanatory diagram illustrating areas where the hole drilling cannot be performed on the workpiece 100.

An upper area E2 of a correction surface of the workpiece 100 is an area sandwiched by the first sandwiching member 71 and the second sandwiching member 72 illustrated in FIG. 14 at the time of hole drilling. Also, an area E1 above the rotating shaft 102 on the correction surface of the workpiece 100 is an area where when trying to perform hole drilling by a drill 37 on this area, the dust collecting part 38 illustrated in FIG. 12 interferes with the rotating shaft 102. The stop position control part 16 calculates, on the basis of the hole drilling positions calculated by the drilling position calculation part 15 and the arrangement of the first sandwiching member 71 and the second sandwiching member 72, the rotation angle position of the workpiece 100 where a hole drilling position 105 by the drilling mechanism 3A and a hole drilling position 106 by the drilling mechanism 3B do not overlap the areas E1 and E2 as illustrated in FIG. 16. Then, the stop position control part 16 controls the stop position after the rotation of the workpiece 100 after the imbalance has been measured by the dynamic balancing test part 1 and before the conveyance by the conveyance part 2. That is, the stop position control part 16 stops the rotation of the workpiece 100 at the rotation angle position where the hole drilling position 105 by the drilling mechanism 3A and the hole drilling position 106 by the drilling mechanism 3B do not overlap the areas E1 and E2.

After the positioning of the workpiece 100 has been finished, the arm 54 illustrated in FIGS. 8 and 9 is moved up by driving of the air cylinder 52, and the workpiece 100 is supported by support parts 55 from the lower side thereof. Then, a fixing member 57 is moved by driving of a corresponding air cylinder 56 to press and fix the workpiece 100 supported by the support parts 55. In this state, the arm 54 is rotated by 180 degrees around the shaft 53 by driving of the motor 51. After that, the arm 54 is moved down by driving of the air cylinder 52. In doing so, the workpiece 100 supported by the support parts 55 is supported on the workpiece table 65 having been moved to the conveyance position in the correction part 3. Then, the fixing member 57 is retracted from a position to abut on the workpiece 100 by driving of the air cylinder 56

At this stage, the operator places a rotating shaft 102 of the workpiece 100 to be subjected to the dynamic balancing test and correction operations next on the paired left and right rollers 42 in the dynamic balancing test part 1. The dynamic balancing test and the correction operations are also performed on the next workpiece 100 in accordance with the same process as that for the previous workpiece 100.

The workpiece 100 placed on the workpiece table 65 is moved to the drilling position illustrated in FIG. 13 by driving of the rodless cylinder 67 illustrated in FIG. 13. Note that the angle position of the workpiece 100 placed on the workpiece table 65 is not changed during the conveyance by the conveyance part 2 and the workpiece table 65. For this reason, the angle position of the workpiece 100 is an angle position where the hole drilling position 105 by the drilling mechanism 3A and the hole drilling position 106 by the drilling mechanism 3B do not overlap the areas E1 and E2 as illustrated in FIG. 16.

In this state, the workpiece 100 on the workpiece table 65 is sandwiched by the first sandwiching member 71 and the second sandwiching member 72. Also, the workpiece 100 on the workpiece table 65 is pressed from the upper side thereof by the pressing arm 61. In doing so, the workpiece 100 is securely fixed also at the time of hole processing to be subsequently performed.

During the operation of fixing the workpiece 100, the drills 37 of the drilling mechanisms 3A and 3B are respectively independently moved in the X Y-directions in the plane orthogonal to the rotating shaft 102 of the workpiece 100 by driving the motors 21 and 22 illustrated in FIGS. 10 to 13. As a result, the drill 37 of the drilling mechanism 3A is moved to a position opposite to the hole drilling position 105 illustrated in FIG. 16 and the drill 37 of the drilling mechanism 3B is moved to a position opposite to the hole drilling position 106 illustrated in FIG. 16. After that, the drills 37 are moved by driving of the motors 23, and the hole drilling is performed on the correction surfaces of the workpiece 100.

At this time, the hole drilling is performed simultaneously on the paired correction surfaces of the workpiece 100, and therefore the time required for the hole drilling can be shortened. Also, at the time of the hole drilling, even when the distance between the correction surfaces of the workpiece 100 is uneven, by controlling the hole drilling depth (the depth of a hole part to be formed) by the drilling mechanism 3B on the basis of the position of the surface on the workpiece 100 side detected by the length measuring sensor 73, the hole drilling can be accurately performed.

Upon completion of the correction of the imbalance of the workpiece 100 by the hole drilling of the workpiece 100, the workpiece 100 is conveyed to the dynamic balancing test part 1 to perform the dynamic balancing test again. At this time, a sandwiched state by the first sandwiching member 71 and the second sandwiching member 72 and a pressed state by the pressing arm 61 are first released. Then, the workpiece table 65 is moved to the conveyance position illustrated in FIG. 1. Subsequently, the arm 54 is moved up by driving of the air cylinder 52 and the workpiece 100 on the workpiece table 65 is supported from the lower side thereof by the support parts 55. Then, a fixing member 57 is moved by driving of a corresponding air cylinder 56 to press and fix the workpiece 100 supported by the support parts 55. In this state, the arm 54 is rotated by 180 degrees around the shaft 53 by driving of the motor 51. After that, the arm 54 is moved down by driving of the air cylinder 52. As a result, the rotating shaft 102 of the workpiece 100 supported by the support parts 55 is placed on the paired left and right rollers 42 in the dynamic balancing test part 1.

During the conveyance of the workpiece 100 from the correction part 3 to the dynamic balancing test part 1, the next workpiece 100 after the completion of the dynamic balancing test is simultaneously conveyed from the dynamic balancing test part 1 to the correction part 3.

The workpiece 100 whose imbalance has been corrected in the correction part 3 and that has been conveyed to the dynamic balancing test part 1 is again subjected to the dynamic balancing test in the dynamic balancing test part 1. After that, when the degree of imbalance is less than a preset reference value, the workpiece 100 is discharged by the operator. On the other hand, when the degree of the imbalance exceeds the preset reference value, the workpiece 100 is again conveyed to the correction part 3.

REFERENCE SIGNS LIST

1: Dynamic balancing test part
2: Conveyance part
3: Correction part
3A: Drilling mechanism
3B: Drilling mechanism
3C: Support part
11: Spring
12: Vibration detecting sensor
13: Laser sensor
14: Imbalance calculation part
15: Drilling position calculation part
16: Stop position control part
21: Motor
22: Motor
23: Motor
25: Guide member
26: Guide member
37: Drill
38: Dust collecting part
41: Servo motor 42: Roller
44: Belt
45: Driven pulley
46: Driving pulley
51: Motor
52: Air cylinder
54: Arm
55: Support part
61: Pressing arm
64: Air cylinder
65: Workpiece table
67: Rodless cylinder
71: First sandwiching member
72: Second sandwiching member
73: Length measuring sensor
100: Workpiece
101: Workpiece body
102: Rotating shaft
103: Mark

The invention claimed is:

1. A dynamic balancing test and correction apparatus comprising:
   a dynamic balancing test part that includes a rotation mechanism adapted to rotate a workpiece provided with a rotating shaft around a shaft center of the rotating shaft and measures a direction and an amount of imbalance of the workpiece by rotation of the workpiece; and
   a correction part that, on a basis of the direction and the amount of the imbalance of the workpiece, the direction and the amount being measured by the dynamic balancing test part, performs hole drilling on paired correction surfaces of the workpiece, each of the paired correction surfaces being orthogonal to a longitudinal axis of the rotating shaft, and thereby corrects the imbalance of the workpiece,
   wherein the correction part further comprises:
   a) a support part that, in a resting state, supports the workpiece whose imbalance has been measured by the dynamic balancing test part;
   b) paired drills that are for performing the hole drilling on the paired correction surfaces of the workpiece supported by the support part, disposed on both sides of the workpiece, and movable in a direction parallel to the longitudinal axis of the rotating shaft of the workpiece; and
   c) a moving mechanism that moves the paired drills respectively independently in mutually orthogonal two directions in a plane orthogonal to the longitudinal axis of the rotating shaft of the workpiece.

2. The dynamic balancing test and correction apparatus according to claim 1, the support part comprising:
   a workpiece sandwiching mechanism that, when the paired drills perform the hole drilling, fixes the workpiece by sandwiching the paired correction surfaces of the workpiece.

3. The dynamic balancing test and correction apparatus according to claim 2, the support part further comprising:
   a workpiece fixing mechanism that, when the paired drills perform the hole drilling, fixes the workpiece by pressing the workpiece in a direction parallel to the paired correction surfaces.

4. The dynamic balancing test and correction apparatus according to claim 2, comprising:
   a conveyance part that conveys the workpiece between the dynamic balancing test part and the correction part; and
   a stop position control part that controls the rotation mechanism so that, when the workpiece whose imbalance has been measured by the dynamic balancing test part is conveyed to the correction part by the conveyance part and supported by the support part, an angle position of the workpiece coincides with an angle position suitable for the hole drilling by the paired drills, and controls a stop position after rotation of the workpiece after the imbalance has been measured by the dynamic balancing test part and before the conveyance by the conveyance part.

5. The dynamic balancing test and correction apparatus according to claim 4, wherein the stop position control part controls the rotation mechanism so that, when the workpiece whose imbalance has been measured by the dynamic balancing test part is conveyed to the correction part by the conveyance part and supported by the support part, a hole drilling position of the workpiece coincides with an angle position incoincident with a position to sandwich the workpiece by the workpiece sandwiching mechanism, and controls the stop position after the rotation of the workpiece after the imbalance has been measured by the dynamic balancing test part and before the conveyance by the conveyance part.

6. The dynamic balancing test and correction apparatus according to claim 4, wherein the stop position control part controls the rotation mechanism so that, when the workpiece whose imbalance has been measured by the dynamic balancing test part is conveyed to the correction part by the conveyance part and supported by the support part, a hole drilling position of the workpiece coincides with an angle position where the rotating shaft of the workpiece and the paired drills do not interfere with each other, and controls the stop position after the rotation of the workpiece after the imbalance has been measured by the dynamic balancing test part and before the conveyance by the conveyance part.

7. The dynamic balancing test and correction apparatus according to claim 1, wherein the paired drills are configured to perform hole drilling at angle positions different between one correction surface and the other correction surface simultaneously.

* * * * *